Aug. 1, 1939.  J. C. LEMMING  2,168,300
SIZING POROUS METAL BEARINGS
Filed Oct. 29, 1937   2 Sheets-Sheet 1

Inventor
John C. Lemming
By Spencer Hardman & Fehr
his Attorneys

Aug. 1, 1939. J. C. LEMMING 2,168,300
SIZING POROUS METAL BEARINGS
Filed Oct. 29, 1937 2 Sheets-Sheet 2

INVENTOR
John C. Lemming
BY
his ATTORNEYS

Patented Aug. 1, 1939

2,168,300

UNITED STATES PATENT OFFICE 2,168,300

SIZING POROUS METAL BEARINGS

John C. Lemming, Dayton, Ohio, assignor to General Motors Corporation, Detroit, Mich., a corporation of Delaware Application October 29, 1937, Serial No. 171,658

6 Claims. (Cl. 205—8)

This invention relates to a method of sizing porous metal bushings and more particularly to a method of sizing porous metal bushings wherein the inner bore thereof is not burnished.

Porous metal bushings, due to the method of manufacture, are generally fabricated in an oversized condition. The usual procedure for fabricating such a bushing is to supply powdered metals to a forming die, apply a heavy pressure on the powdered material whereby the same is compacted into a briquette and then sinter the briquetted metal powders under sufficiently high temperature conditions, and in a suitable atmosphere, so as to form a homogeneous mass approximating a true alloy and which is characterized by a continuous metallic network having intercommunicating pores therein. In such a method it is often difficult to hold the porous metal article to the exact size required and therefore a subsequent sizing operation is necessary. The sizing operation further compresses the metal article and thereby reduces the porosity thereof to a slight extent while increasing resistance of the article to compressive load.

Porous metal bushings fabricated in the hereinbefore described manner are subsequently impregnated with a lubricant and due to their porosity allow the lubricant to be present at the bearing surfaces when the bushings are in use. Obviously, since the entire bushing is porous considerable lubricant is contained therein which lubricant constantly replenishes and thereby maintains the lubricant film at the bearing surface due to capillarity. It is apparent that any substantial burnishing at the inner surface of such bushings would tend to close off the pores and thereby prevent capillary feeding of lubricant to the bearing surfaces. The present invention causes no substantial burnishing at the inner surfaces of processed bushings and therefore produces sized bushings having self-lubricating properties.

In the sizing of bushings made of porous metal one of the problems that has arisen, when operating on a relatively thin walled bushing is the flaring of the ends of the bushing after the same has passed through the sizing die. This flaring is occasioned by the fact that when a porous metal bushing is pressed through the sizing die the material in the bushing is highly compressed and therefore upon release of the pressure has a slight tendency to expand. It is apparent that such a tendency toward expansion is more marked at the ends of the bushing than at the central portion thereof and therefore the sized bushing is slightly flared or bell-mouthed at the ends thereof.

The present invention is directed to a method of sizing porous metal bushings wherein this flaring is eliminated while the procedure of sizing the bushing remains simple and inexpensive. It is an object of the present invention to provide a method of sizing a porous metal bushing comprising passing the bushing, assembled on a sizing mandrel, through a succession of sizing dies of progressively decreasing diameter, in a continuous movement, whereby the bushing is compressed radially inwardly to the mandrel diameter in successive stages. The bushing after passing through the dies expands a sufficient amount so that it is stripped from the mandrel as the mandrel is retracted therefrom without any substantial burnishing at the inner thereof.

It is a further object of the invention to cause the bushing, as assembled on a sizing mandrel, to pass through a die which includes a plurality of steps of progressively decreasing diameter whereby the bushing is progressively compressed radially inwardly to the mandrel diameter in successive stages.

It is still a further object of the invention to provide a method of sizing the porous metal bushing in which the porous metal bushing assembled on a sizing mandrel is passed through a die which has a bore therethrough of progressively decreasing diameter, whereby the bushing upon passing through the die is progressively compressed radially inwardly in successive stages to correspond to the diameter of the sizing mandrel.

Further objects and advantages of the present invention will be apparent from the following description, reference being had to the accompanying drawings wherein preferred embodiments of the present invention are clearly shown.

Figure 1:
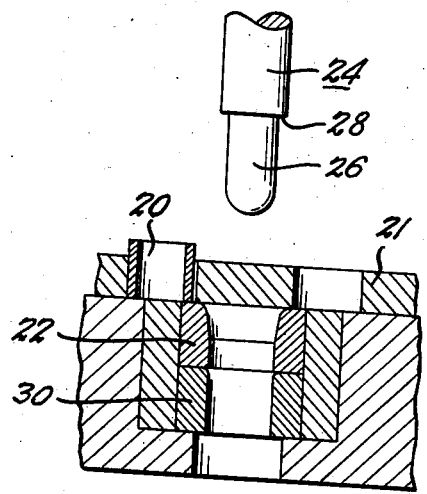
Figs. 1 through 6 are fragmentary views, partly in section, of the sizing mandrel and dies showing a bushing in various positions as it is assembled on the sizing mandrel and passed through the sizing dies.
Figure 2:
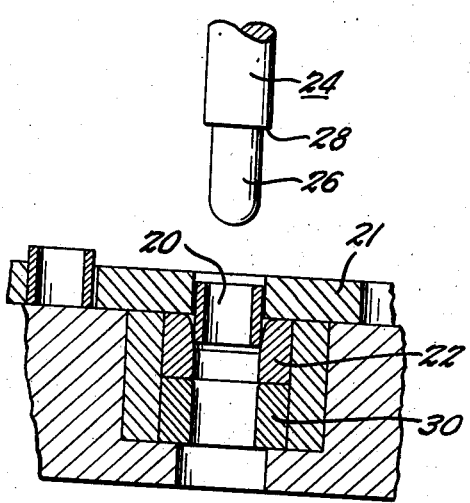
Figure 3:
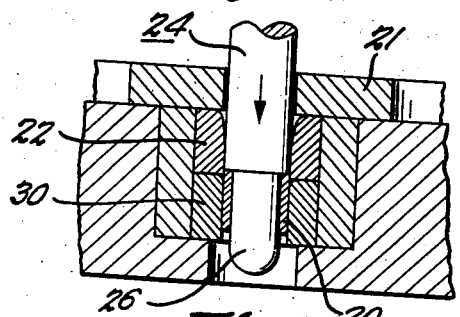
Figure 4:
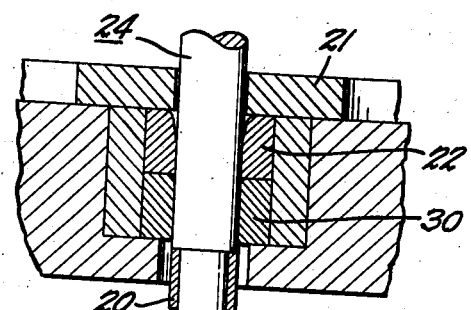
Figure 5:
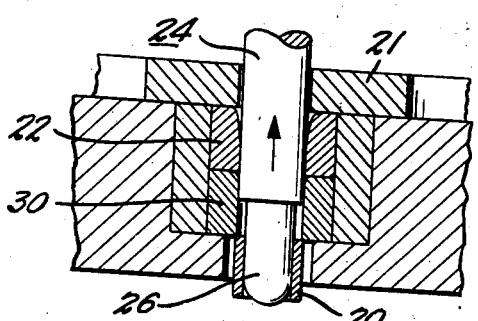
Figure 6:
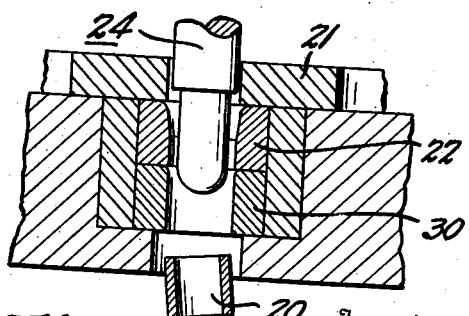

Referring to Fig. 1, a bushing 20 is shown in a dial type feeder 21 (shown in part) prior to the entry of the bushing into a sizing die 22. In Fig. 2 the indexed dial feeder 21 is aligned with the die and the bushing 20 has partially dropped into the die 22. After the bushing 20, is in this position a reciprocating shouldered sizing mandrel 24 having a portion 26 equal to the desired inner diameter of the bushing descends and the portion 26 thereof passes through the bushing until such time as the shoulder 28 engages the end of the bushing 20. Further movement of the mandrel 24 causes the bushing to be forced downwardly through the die 22. It will be noted that the die 22 is rounded or chamfered at the entry thereof, to facilitate positioning of the bushing therein, and then tapers to a bore having a substantially constant diameter. The bore of the die 22 is slightly in excess of the desired outer diameter of the bushing but is slightly smaller than the outer diameter of the unsized bushing 20. In order to exactly size the bushing 20, a second die 30 is provided and is in register with the die 22. Thus, continued downward movement of the mandrel 24 causes the bushing 20 to next pass through the die 30. The entry end of die 30 is slightly chamfered for reasons heretofore mentioned and the bore thereof is substantially equal to the desired outer diameter of the bushing 20. The bushing 20 when passing from die 22 to die 30 may expand within the space formed by the chamfer on die 30 but it is again compressed as it enters the die 30. Mandrel 24 continues to descend until such time as it is in the position shown in Fig. 4, wherein the bushing 20 has completely passed through the body of the sizing dies 22 and 30. The bushing 20 having been substantially compressed radially inwardly has a slight tendency to expand radially outwardly after the external pressure is removed therefrom and therefore after passing through the die 30 the bushing 20 expands slightly so that when the mandrel 24 is withdrawn as noted in Figs. 5 and 6 the bushing will not re-enter the die 30 but will be stripped from the mandrel and dropped into a receiving bin (not shown).

It has been found in practice that the inside diameter of the die 30 is preferably approximately .005–.010 of an inch smaller than the inside diameter of the die 22 when operating on a bushing having a wall thickness of between .100 and .150 inch.

The difference in the diameters of the two dies 22 and 30 should vary with the thickness of the wall of the bushing. Thus when a thick walled bushing is to be sized the difference in diameter of the two dies can be relatively greater than when a thin wall bushing is being sized. It is preferable to make experimental tests to determine the proper difference in diameter between the dies.

The principle behind the present method is apparent in that the bushing 20 after passing through the first die 22 tends to be flared at the ends thereof but upon entry to the second die 30 is again compressed, mainly at the ends thereof, to cause the ends to be compressed radially inwardly. The successive compression of the bushing 20 when passing through the second die 30 is relatively slight when compared to the initial compression when the bushing 20 passes through the first die 22. Thus by successively decreasing the diameter of the bushing 20 by a very small amount the tendency toward flaring is eliminated.

Since the mandrel 24 and bushing 20 do not move relative to each other when passing through the dies the inner surface of the bushing 22 is rendered smooth by radial inward compression only and the porosity thereof is not destroyed. Likewise since there is no relative movement between the bushing 20 and the mandrel 24 the inner bore of the bushing 20 is not burnished. During the stripping operation the bushing 20 expands sufficiently to prevent any substantial burnishing during withdrawal of the mandrel 24.

Figure 9:
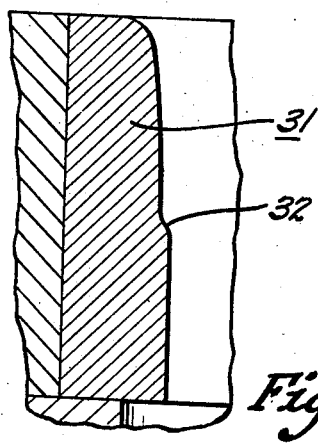
Fig. 9 is an enlarged fragmentary view in section of the die shown in Fig. 8.
Figure 8:
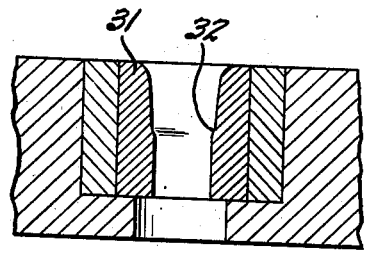
Fig. 8 is a view in section of a modified sizing die on an exaggerated scale to more clearly define the structure thereof.

In Figs. 8 and 9 a modified die structure 31 is shown wherein the sizing dies 22 and 30 are incorporated as a single die 31 having a step 32 therein. The sizing action upon the bushing 20, as the same is passed therethrough, is similar to the action hereinbefore described with reference to the preferred form of die.

Figure 7:
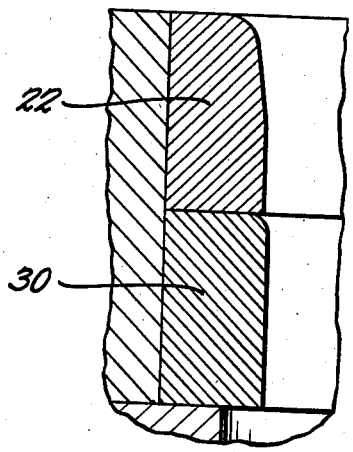
Fig. 7 is an enlarged fragmentary view in section of the dies as shown in Figs. 1 to 6, the view being exaggerated to more clearly define the structure of the dies.
Figure 11:
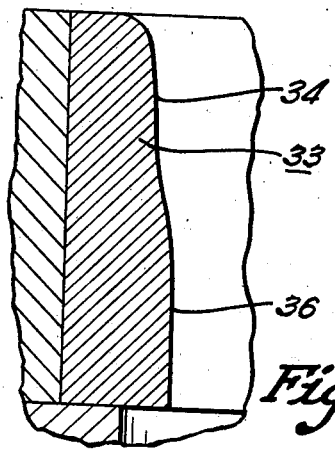
Figure 10:
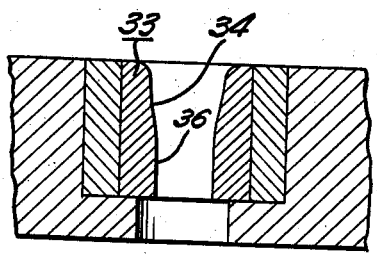
Fig. 10 is a view, in section of a second modification of die design, the view being exaggerated to more clearly define the structure of the die, and, Fig. 11 is an enlarged fragmentary view, in section, of the die shown in Fig. 10.

Figs. 10 and 11 show still another type of die structure 33 wherein the inner diameter of the die 33 is progressively decreased so that the portion 34 thereof substantially corresponds to die 22 shown in Fig. 7 and the portion 36 thereof substantially corresponds to the die 30 in Fig. 7. In this embodiment the constricting action tending to deform the bushing 20 radially inwardly about the mandrel 24 is effected in a more gradual manner than in either of the other embodiments disclosed, since the inner surface of the die 33 tapers gradually between the straight walled portions thereof and therefore has no abrupt change in diameter as noted in the other embodiments.

While the drawings show the sizing dies inset in a die support this construction is not limiting but merely sets forth one embodiment of the present invention. Obviously the dies could be included in the die supports as an integral part thereof.

The two die type of construction shown in Figs. 1–7 is preferred since it is apparent that the greatest die wear occurs during the initial sizing of the bushing. Thus in the preferred embodiment the die 22 can be replaced, when worn, without the necessity of replacing die 30 which is not appreciably worn. Obviously, this construction reduces maintenance costs of the dies and therefore is preferred in practice.

While the embodiments of the present invention as herein disclosed, constitute preferred forms, it is to be understood that other forms might be adopted, all coming within the scope of the claims which follow.

What is claimed is as follows:

1. The method of sizing a porous metal bushing formed from sintered powdered metal without causing burnishing at the inner surface thereof which comprises the steps, of assembling the bushing on a sizing mandrel having a diameter substantially equal to the desired inside diameter of said bushing after the same has been sized; causing the assembled bushing and mandrel to be passed through a successsion of sizing dies of progressively decreasing diameter in a continuous movement while preventing relative movement between the bushing and the mandrel, whereby the bushing is compressed radially inwardly to the mandrel diameter in successive stages without substantially closing the pores at the inner surface thereof.

2. The method of sizing a porous metal bushing formed from sintered powdered metal without causing burnishing at the inner surface thereof which comprises the steps, of assembling the bushing on a sizing mandrel having a diameter substantially equal to the desired inside diameter of said bushing after the same has been sized; causing the assembled bushing and mandrel to be passed through a succession of sizing dies of progressively decreasing diameter in a continuous movement while preventing relative movement between the bushing and the mandrel, whereby the bushing is compressed radially inwardly to the mandrel diameter in successive stages; and then removing the bushing from the mandrel.

3. The method of sizing a porous metal bushing formed from sintered powdered metal without causing burnishing at the inner surface thereof which comprises the steps, of assembling the bushing on a sizing mandrel having a diameter substantially equal to the desired inside diameter of said bushing after the same has been sized; causing the assembled bushing and mandrel to pass through a sizing die which has a bore therethrough of progressively decreasing diameter while preventing relative movement between the bushing and the mandrel, whereby the bushing upon passing through the die is progressively compressed radially inwardly in successive stages to correspond to the diameter of the sizing mandrel without substantially closing the pores at the inner surface.

4. The method of sizing a porous metal bushing formed from sintered powdered metal without causing burnishing at the inner surface thereof which comprises the steps, of assembling the bushing on a sizing mandrel having a diameter substantially equal to the desired inside diameter of said bushing after the same has been sized; causing the assembled bushing and mandrel to be passed through a die which has a plurality of steps therein of progressively decreasing diameter while preventing relative movement between the bushing and the mandrel, whereby the bushing is progressively compressed radially inwardly to the desired size in successive stages, to prevent flaring at the ends of the bushing.

5. The method of sizing a porous metal bushing formed from sintered powdered metal without causing burnishing at the inner surface thereof which comprises the steps, of assembling the bushing on a sizing mandrel having a diameter substantially equal to the desired inside diameter of said bushing after the same has been sized; causing the assembled bushing and mandrel to be passed through a die which has a plurality of steps therein of progressively decreasing diameter, whereby the bushing is progressively compressed radially inwardly to the desired size in successive stages while preventing relative movement between the bushing and the mandrel, to prevent flaring at the ends of the bushing, and then removing the bushing from the mandrel without substantially closing the pores at the inner surface thereof.

6. The method of sizing a porous metal bushing without causing burnishing at the inner surface thereof which comprises the steps, of assembling the bushing on a sizing mandrel having a diameter substantially equal to the desired inside diameter of said bushing after the same has been sized, causing the bushing to be progressively compressed radially inwardly about the mandrel in a succession of stages, whereby the bushing is deformed so that its inner diameter is substantially equal to the mandrel diameter and its outer diameter is substantially constant throughout the length thereof.

JOHN C. LEMMING.